(12) United States Patent
Tetsuka et al.

(10) Patent No.: US 10,279,857 B2
(45) Date of Patent: May 7, 2019

(54) VEHICLE DRIVING FORCE CONTROL DEVICE

(71) Applicant: HONDA MOTOR CO., LTD., Tokyo (JP)

(72) Inventors: Takashi Tetsuka, Wako (JP); Yoshihiro Nomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/562,168

(22) PCT Filed: Mar. 29, 2016

(86) PCT No.: PCT/JP2016/060198
§ 371 (c)(1),
(2) Date: Sep. 27, 2017

(87) PCT Pub. No.: WO2016/158985
PCT Pub. Date: Oct. 6, 2016

(65) Prior Publication Data
US 2018/0079465 A1    Mar. 22, 2018

(30) Foreign Application Priority Data

Mar. 30, 2015    (JP) ................. 2015-070053

(51) Int. Cl.
*B62K 23/02* (2006.01)
*F02D 11/10* (2006.01)
(Continued)

(52) U.S. Cl.
CPC .............. *B62K 23/02* (2013.01); *B60K 26/02* (2013.01); *B60K 31/00* (2013.01); *B62J 99/00* (2013.01);
(Continued)

(58) Field of Classification Search
CPC ........ B62K 23/02; B62K 23/04; G02D 11/10; G02D 11/02; G02D 11/06
(Continued)

(56) References Cited

U.S. PATENT DOCUMENTS

2006/0219455 A1* 10/2006 Watanabe .............. B62K 23/02
                                                                        180/219
2009/0204284 A1*  8/2009 Nakajima .............. B60L 15/20
                                                                        701/31.4
(Continued)

FOREIGN PATENT DOCUMENTS

DE    19751211 A1    5/1999
EP    0964232 A1    12/1999
(Continued)

OTHER PUBLICATIONS

Nov. 21, 2018 Extended Search Report issued in European Patent Application No. 16772866.6.
(Continued)

*Primary Examiner* — Tan Q Nguyen
(74) *Attorney, Agent, or Firm* — Squire Patton Boggs (US) LLP (57) ABSTRACT

A vehicle driving force control device controls a driving force of an engine in accordance with an operation of a handlebar grip attached to a motorcycle. The handlebar grip is nonrotatably secured to a handlebar of the motorcycle. The vehicle driving force control device includes a strain gauge and a control section. The strain gauge acts as twisting force detection means for detecting a twisting force that is oriented in a normal rotation direction or in a reverse rotation direction and applied to the handlebar grip. The control section controls the driving force in accordance with the detected twisting force. The control section exercises (Continued)

control to increase the driving force in accordance with the twisting force oriented in the normal rotation direction.

15 Claims, 8 Drawing Sheets

(51) Int. Cl.
*B60K 31/00* (2006.01)
*B62J 99/00* (2009.01)
*B62K 23/04* (2006.01)
*F02D 11/02* (2006.01)
*B60K 26/02* (2006.01)

(52) U.S. Cl.
CPC .............. *B62K 23/04* (2013.01); *F02D 11/02* (2013.01); *F02D 11/10* (2013.01); *F02D 11/106* (2013.01); *B60Y 2200/12* (2013.01); *B60Y 2300/14* (2013.01); *Y02T 10/7275* (2013.01)

(58) Field of Classification Search
USPC .................................................. 701/93, 31.4
See application file for complete search history.

(56) References Cited

U.S. PATENT DOCUMENTS

| | | |
|---|---|---|
| 2014/0032077 A1 | 1/2014 | Sasaki |
| 2015/0081172 A1* | 3/2015 | Matsuo ................. B62K 21/08 701/41 |
| 2016/0152298 A1* | 6/2016 | Augustin ............... B62K 23/04 74/504 |

FOREIGN PATENT DOCUMENTS

| | | |
|---|---|---|
| EP | 1714862 A2 | 10/2006 |
| EP | 2 690 269 A1 | 1/2014 |
| EP | 2 974 927 A1 | 1/2016 |
| EP | 3057860 A1 | 8/2016 |
| JP | H07-112626 A | 5/1995 |
| JP | H11-310182 A | 11/1999 |
| JP | 2002-067964 A | 3/2002 |
| JP | 2014-025348 A | 2/2014 |
| WO | WO 2014/142212 A1 | 9/2014 |

OTHER PUBLICATIONS

International Search Report & Written Opinion dated Jun. 14, 2016 corresponding to International Patent Application No. PCT/JP2016/060198, and English translation thereof.

* cited by examiner

VEHICLE DRIVING FORCE CONTROL DEVICE

CROSS-REFEERENCE TO RELATED APPLICATIONS

The present application claims priority under 35 USC 119 to Japanese Patent Application No. 2015-070053 filed Mar. 30, 2015 the entire contents of which are hereby expressly incorporated by reference.

TECHNICAL FIELD

The present invention relates to a vehicle driving force control device and, more particularly, to a vehicle driving force control device for adjusting the output of an engine, an electric motor, or other source of motive power.

BACKGROUND ART

A conventionally known vehicle driving force control device adjusts the output of an engine, an electric motor, or other motive power source by rotating a handlebar grip that is rotatably attached to an end of a handlebar of a vehicle.

A configuration disclosed in Patent Document 1 controls the driving force (output) of an engine or an electric motor by rotational operation of the handlebar grip by allowing a wire attached at one end to the handlebar grip to be pulled by the rotation of the handlebar grip and connecting a carburetor throttle valve or an electric motor control device to the other end of the wire.

CITATION LIST

Patent Literature

Patent Document 1: JP H11-310182 A

SUMMARY OF INVENTION

Technical Problem

However, the control device described in Patent Document 1 needs to increase the rotation angle of the handlebar grip in accordance with a desired driving force. Therefore, it is conceivable that the posture of a driver of the vehicle may significantly change due to the rotation of the handlebar grip. Consequently, such a driver's operation can be further improved.

It is an object of the present invention to solve the problems of the conventional technology and provide a vehicle driving force control device that provides improved operability without allowing a handlebar grip operation to significantly change the posture of a vehicle occupant.

Solution to Problems

To achieve the afore-mentioned object, the present invention has a first feature in that a vehicle driving force control device for controlling a driving force (K) of a motive power source (E, M) in accordance with an operation of a handlebar grip (8) attached to a vehicle (1), the handlebar grip (8) being nonrotatably secured to the vehicle (1), the vehicle driving force control device comprising: twisting force detection means (30) for detecting a twisting force (N) that is oriented in one direction or in the other direction and applied to the handlebar grip (8); and a control section (50, 50a) configured to control the driving force (K) in accordance with the detected twisting force (N), wherein the control section (50, 50a) exercises control to increase the driving force (K) in accordance with the twisting force (N) oriented in the one direction.

The present invention has a second feature in that when the twisting force (N) is not detected by the twisting force detection means (30), the control section (50, 50a) exercises control to gradually decrease the driving force (K) of the motive power source (E, M).

The present invention has a third feature in that the control section (50, 50a) exercises control to decrease the driving force (K) in accordance with the twisting force (N) oriented in the other direction.

The present invention has a fourth feature in that vehicle speed detection means (54) for detecting a vehicle speed (V) of the vehicle (1) is comprised, wherein, when the twisting force (N) is at a predetermined value (S2), the control section (50, 50a) controls the driving force (K) in such a manner as to keep the vehicle speed (V) constant.

The present invention has a fifth feature in that even when the twisting force (N) changes within a first predetermined range ($\Delta S_1$), the control section (50, 50a) does not change the driving force (K) in accordance with the change in the twisting force (N).

The present invention has a sixth feature in that vehicle speed detection means (54) for detecting a vehicle speed (V) of the vehicle (1) and running resistance calculation means (51) for determining a running resistance (f) based on the vehicle speed (V) are comprised, wherein, if the twisting force (N) remains at the predetermined value (S2) or within the first predetermined range ($\Delta S_1$) for a predetermined period of time, the control section (50, 50a) executes cruise control for balancing the driving force (K) with the running resistance (f).

The present invention has a seventh feature in that if the twisting force (N) is outside a second predetermined range ($\Delta S_2$) during the cruise control, the cruise control terminates.

The present invention has an eighth feature in that gear ratio detection means (52) for detecting the gear ratio of a transmission (56) of the vehicle (1) is comprised, wherein the control section (50, 50a) controls the driving force (K) in accordance with the twisting force (N), the gear ratio, and the running resistance (f).

The present invention has a ninth feature in that the vehicle (1) is a motorcycle that uses an engine (E) or an electric motor (M) as a motive power source, the handlebar grip (8) is fastened to an end of a handlebar (5) through a detection target (5a), the handlebar (5) steering a front wheel of the motorcycle, and the twisting force detection means (30) is a strain gauge attached to the detection target (5a).

Advantageous Effects of Invention

According to the first feature, the handlebar grip (8) being nonrotatably secured to the vehicle (1), twisting force detection means (30) for detecting a twisting force (N) that is oriented in one direction or in the other direction and applied to the handlebar grip (8); and a control section (50, 50a) configured to control a driving force (K) in accordance with the detected twisting force (N), wherein the control section (50, 50a) exercises control to increase the driving force (K) in accordance with the twisting force (N) oriented in the one direction. Therefore, the driving force of the vehicle's motive power source can be increased by applying the twisting force to the nonrotatable handlebar grip. This provides increased ease of operation of the driving force control device without allowing a handlebar grip operation to significantly change the posture of the driver.

According to the second feature, when the twisting force (N) is not detected by the twisting force detection means (30), the control section (50, 50a) exercises control to gradually decrease the driving force (K) of the motive power source (E, M). Therefore, when no twisting force is applied to the handlebar grip, the driving force of the motive power source can be naturally decreased.

According to the third feature, the control section (50, 50a) exercises control to decrease the driving force (K) in accordance with the twisting force (N) oriented in the other direction. Therefore, when reversely-oriented twisting force is applied to the handlebar grip, control is exercised to decrease the driving force. Consequently, the driving force can be intentionally decreased.

According to the fourth feature, vehicle speed detection means (54) for detecting a vehicle speed (V) of the vehicle (1) is comprised, wherein, when the twisting force (N) is at a predetermined value (S2), the control section (50, 50a) controls the driving force (K) in such a manner as to keep the vehicle speed (V) constant. Therefore, the vehicle speed is maintained constant while a small twisting force is applied to the handlebar grip. Consequently, an operational load imposed on the driver can be reduced.

According to the fifth feature, even when the twisting force (N) changes within a first predetermined range ($\Delta S_1$), the control section (50, 50a) does not change the driving force (K) in accordance with the change in the twisting force (N). Therefore, the vehicle can be maintained at a constant speed without allowing the driving force to change in accordance with a slight change in the twisting force applied to the handlebar grip.

According to the sixth feature, vehicle speed detection means (54) for detecting a vehicle speed (V) of the vehicle (1) and running resistance calculation means (51) for determining a running resistance ((f) based on the vehicle speed (V) are comprised, wherein, if the twisting force (N) remains at the predetermined value (S2) or within the first predetermined range ($\Delta S_1$) for a predetermined period of time, the control section (50, 50a) executes cruise control for balancing the driving force (K) with the running resistance (f). Therefore, operating only the handlebar grip makes it possible to switch to cruise control that permits the vehicle to cruise at a constant speed by balancing the driving force with the running resistance.

According to the seventh feature, if the twisting force (N) is outside a second predetermined range ($\Delta S_2$) during the cruise control, the cruise control terminates. Therefore, cruise control can be terminated simply by performing a gripping operation.

According to the eighth feature, ear ratio detection means (52) for detecting the gear ratio of a transmission (56) of the vehicle (1) is comprise, wherein the control section (50, 50a) controls the driving force (K) in accordance with the twisting force (N), the gear ratio, and the running resistance (f). This increases the accuracy of calculating an appropriate driving force.

According to the ninth feature, the vehicle (1) is a motorcycle that uses an engine (E) or an electric motor (M) as a motive power source, the handlebar grip (8) is fastened to an end of a handlebar (5) through a detection target (5a), the handlebar (5) steering a front wheel of the motorcycle, and the twisting force detection means (30) is a strain gauge attached to the detection target (5a). Therefore, when the handlebar grip involving no rotation operation is used instead of a conventional throttle grip that is pushed back to an initial position by a return spring, it is possible to obtain a motorcycle that is capable of adjusting the driving force of the motive power source without causing a significant change in the posture of the driver.

DESCRIPTION OF EMBODIMENTS

Figure 1:
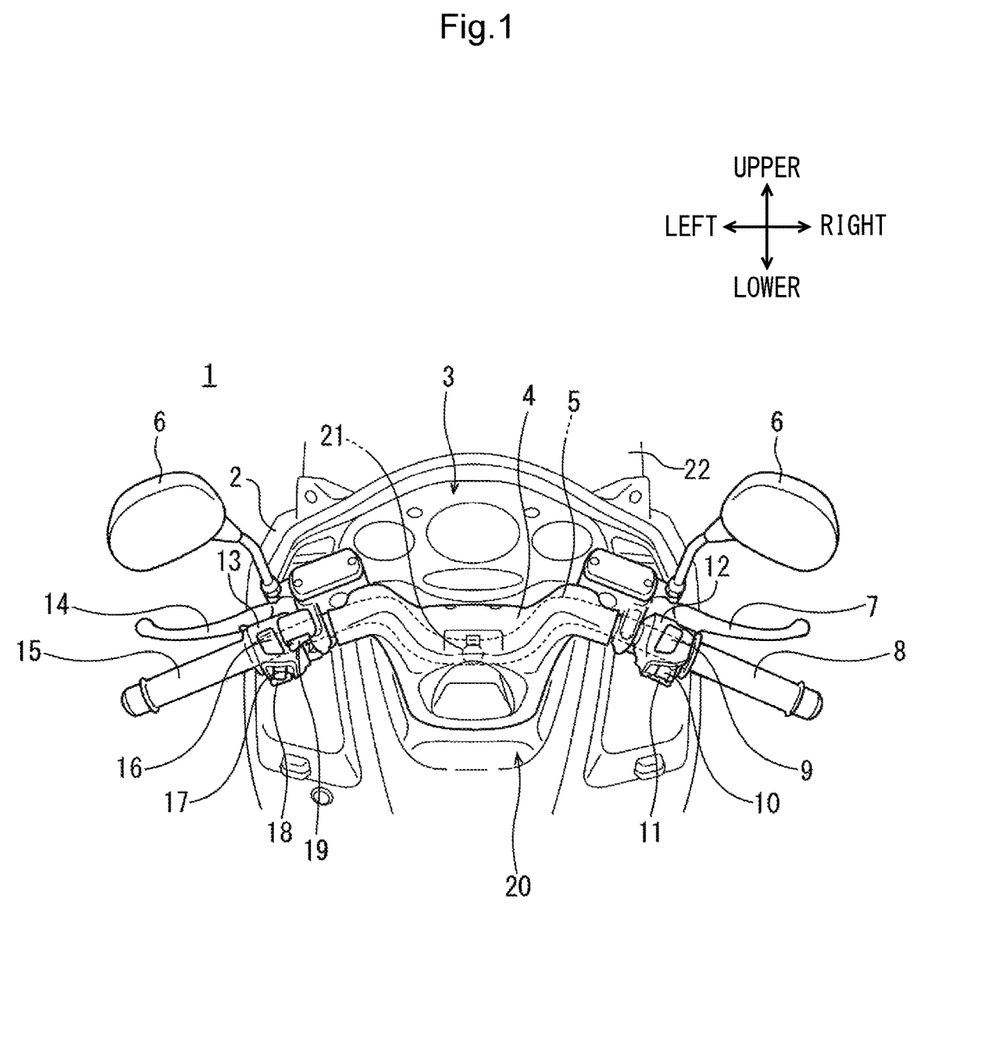
FIG. 1 is an enlarged view illustrating a handlebar section of a motorcycle.

A preferred embodiment of the present invention will now be described in detail with reference to the accompanying drawings. FIG. 1 is an enlarged view illustrating a handlebar section of a motorcycle 1 to which a vehicle driving force control device according to an embodiment of the present invention is applied. The motorcycle 1 is a straddle-type vehicle that runs by using a motive power source formed of a vehicle-mounted engine or electric motor to drive a rear wheel and by swinging a handlebar 5 to steer a front wheel.

The handlebar 5, which is formed of a metal pipe member, is coupled at the widthwise center of the vehicle to a steering stem 21 that acts as a swing axis for the handlebar 5. The widthwise center of the vehicle is covered with a handlebar cover 4 formed of resin. A floor panel 20 is disposed below the handlebar 5. The floor panel 20, which faces a driver of the vehicle, covers a vehicle body frame. An instrument panel 3 is disposed in front of the handlebar 5. A front of the vehicle body, which is positioned forward of the instrument panel 3, is covered with a front cowl 2 having a windscreen 22. A rear-view mirror 6 is mounted on both the left and right sides of the handlebar 5.

Mounted on the right side of the handlebar 5 are a right-side handlebar grip 8, a right-side handlebar switch 12, and a right-side brake lever 7. The right-side handlebar grip 8 is to be gripped by the right hand of the driver. The right-side handlebar switch 12 is box-shaped to include a plurality of switches. The right-side handlebar grip 8 functions as a manipulator for controlling the driving force K of the motive power source. Disposed on the right-side handlebar switch 12 are a stop switch 9, a hazard lamp switch 10, and a starter switch 11. The stop switch 9 is used as desired to stop the motive power source for the motorcycle 1. The hazard lamp switch 10 causes the left and right directional indicators to blink synchronously. The starter switch 11 starts the motive power source.

Mounted on the left side of the handlebar 5 are a left-side handlebar grip 15, a left-side handlebar switch 13, and a left-side brake lever 14. The left-side handlebar grip 15 is to be gripped by the left hand of the driver. Disposed on the left-side handlebar switch 13 are an optical axis selector switch 16 for a headlight, a directional indicator switch 17, and a horn switch 18. A cruise setup switch 19 is disposed above the left-side handlebar switch 13 and used during later-described cruise control.

Figure 2:
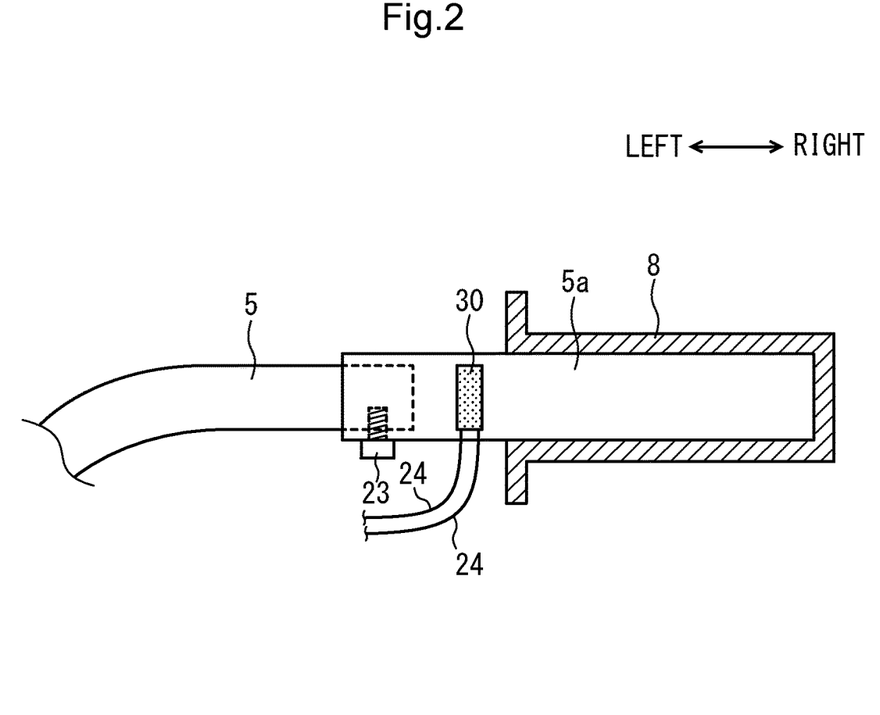
FIG. 2 is a diagram illustrating the structure of a mounting section for a handlebar grip.

FIG. 2 is a diagram illustrating the structure of a mounting section for the right-side handlebar grip (hereinafter simply referred to as the handlebar grip) 8. The vehicle driving force control device according to the present invention is configured so as to control the driving force of the motive power source in accordance with a signal from a strain gauge 30 for detecting a twisting force N that is generated when a vehicle occupant attempts to rotate the handlebar grip 8, which is nonrotatably secured to the handlebar 5.

A detection target 5a is secured to an end of the handlebar 5 by using a screw or other fastening member 23. The handlebar grip 8 is secured to cover an end of the detection target 5a. Consequently, the handlebar grip 8 is nonrotatably attached to the handlebar 5 through the detection target 5a. The strain gauge 30, which acts as twisting force detection means, is positioned between the handlebar grip 8 and the fastening member 23 for coupling to the handlebar 5, and is attached to the surface of the detection target 5a.

For example, a solid or hollow member formed of metal or resin is used to give appropriate rigidity to the detection target 5a for the purpose of detecting the twisting force N equivalent to the force of rotating a throttle grip that is pushed back to an initial position by a common rotary handlebar grip, that is, a return spring. Consequently, the strain gauge 30 detects a force that the driver applies in an attempt to rotate the handlebar grip 8.

The strain gauge 30 is obtained by attaching resistance wire or resistance foil arranged in a grid form to the surface of an insulating sheet and connecting a wire 24 to each end of the strain gauge 30. The value of resistance changes in accordance with the deformation of the detection target 5a. The present embodiment is configured so that the strain gauge 30 expands to decrease the resistance value when the axis line of the handlebar grip 8 is twisted in a direction of normal rotation (in one direction), that is, a counterclockwise direction as viewed from the right side of the vehicle body, and that the strain gauge 30 contracts to increase the resistance value when the axis line of the handlebar grip 8 is twisted in a direction of reverse rotation (in the other direction), that is, a clockwise direction.

Figure 3:
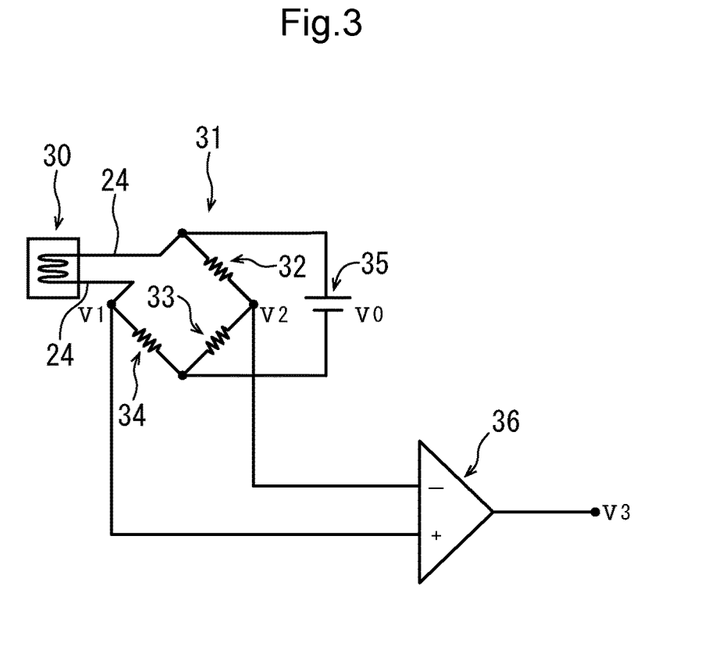
FIG. 3 is a diagram illustrating a configuration of a bridge circuit that detects a change in a resistance value of a strain gauge.

FIG. 3 is a diagram illustrating a configuration of a bridge circuit that detects a change in the resistance value of the strain gauge 30. A Wheatstone bridge circuit 31, which is a well-known electrical circuit, includes not only the strain gauge 30 but also a power supply V0 and resistors 32, 33, and 34. The Wheatstone bridge circuit 31 is capable of detecting a slight resistance value change in the strain gauge 30, as an output voltage change, in accordance with the potential difference between V1 and V2, which depends on the resistance value change in the strain gauge 30. The present embodiment is applied so that V3 outputted from a comparator 36 is regarded as a strain gauge output S.

Figure 4:
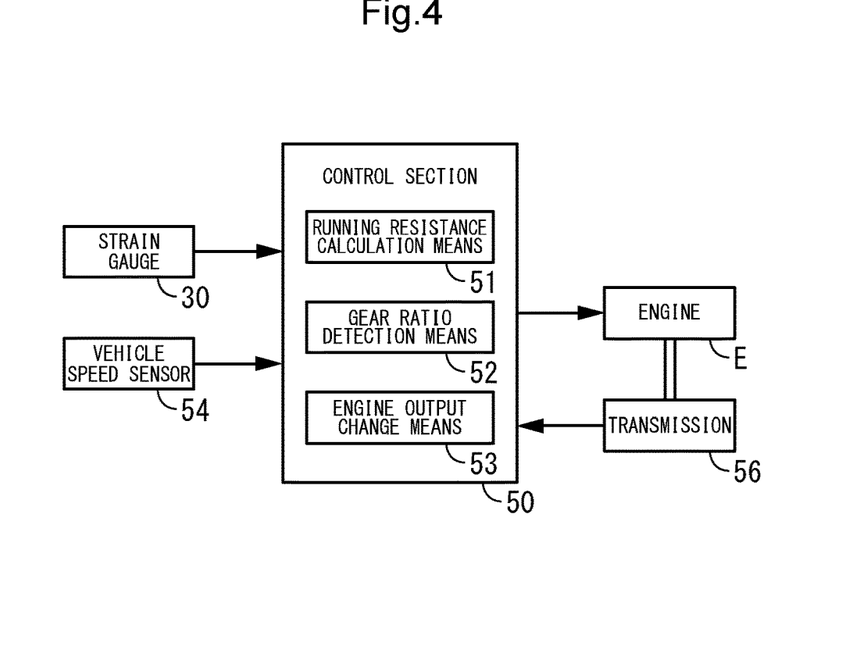
FIG. 4 is a block diagram illustrating a configuration of a vehicle driving force control device and its related equipment. (An engine is employed as a motive power source.)
Figure 5:
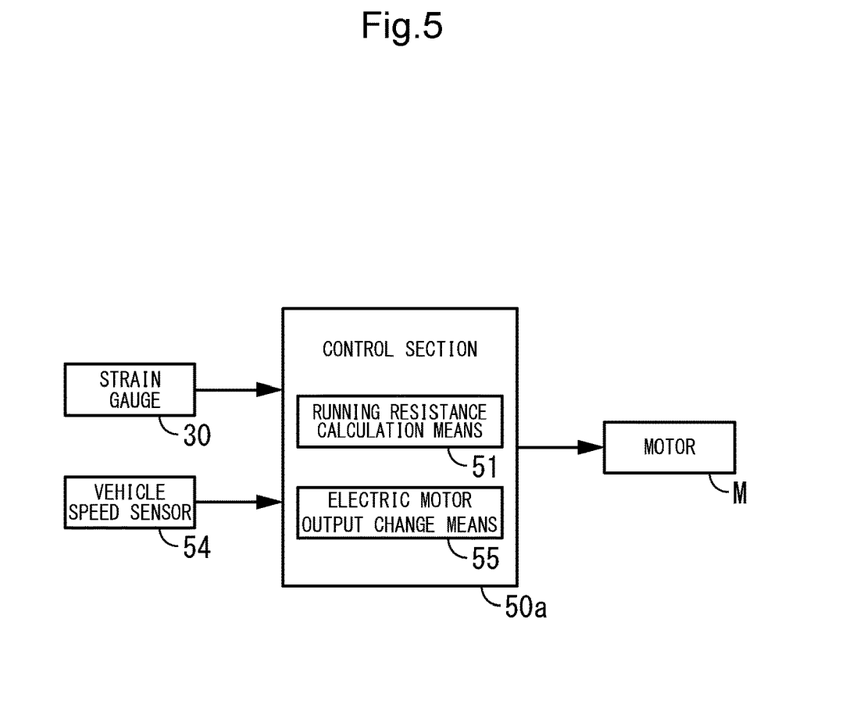
FIG. 5 is a block diagram illustrating a configuration of a vehicle driving force control device and its related equipment. (An electric motor is employed as a motive power source.)

FIGS. 4 and 5 are block diagrams illustrating a configuration of the vehicle driving force control device and its related equipment. FIG. 4 depicts a case where an engine E is employed as the motive power source. FIG. 5 depicts a case where an electric motor M is employed as the motive power source. The same reference signs in FIGS. 4 and 5 denote identical or equivalent elements.

Referring to FIG. 4, a control section 50, which acts as the vehicle driving force control device, includes running resistance calculation means 51, gear ratio detection means 52, and engine output change means 53. The running resistance calculation means 51 accesses a predetermined database to calculate a running resistance f based on the speed of the vehicle. The gear ratio detection means 52 detects the gear ratio of a transmission 56 coupled to the engine E. The engine output change means 53 controls the driving force K of the engine E. The control section 50 receives an output signal from the strain gauge 30 and from a vehicle speed sensor 54.

The running resistance calculation means 51 derives the running resistance f from the predetermined database in accordance with the output signal of the vehicle speed sensor 54. The engine output change means 53 controls the output of the engine E in accordance with the derived running resistance f and the output signal of the strain gauge 30. In this instance, the driving force K to be generated by the engine E can be changed in accordance with the gear ratio. In such a case, the control section 50 controls the driving force K in accordance with the output signal of the strain gauge 30, the gear ratio of the transmission 56, and the running resistance f.

Output control of the engine E is executed by controlling an actuator that drives a throttle valve disposed in an intake pipe for the engine E. The gear ratio to be detected by the gear ratio detection means 52 may be determined based on the gear position of a stepped transmission coupled to the engine E. However, when the employed transmission is a continuously variable transmission that enables the actuator to provide a continuously variable gear ratio, the gear ratio to be detected may be determined based on a pseudo gear position that is set to gradually change the gear ratio between predetermined gear ratios.

Referring to FIG. 5, when the electric motor M is employed as the motive power source, the configuration may exclude the transmission and the gear ratio detection means. A control section 50a includes the running resistance calculation means 51 and electric motor output change means 55. The control section 50a receives an output signal from the strain gauge 30 and from the vehicle speed sensor 54.

The running resistance calculation means 51 in the control section 50a derives the running resistance f from a predetermined database in accordance with the output signal of the vehicle speed sensor 54. The electric motor output change means 55 controls the output of the electric motor M in accordance with the derived running resistance f and the output signal of the strain gauge 30. An alternative configuration may be adopted so as to include a transmission and use the electric motor M as the motive power source.

Figure 6:
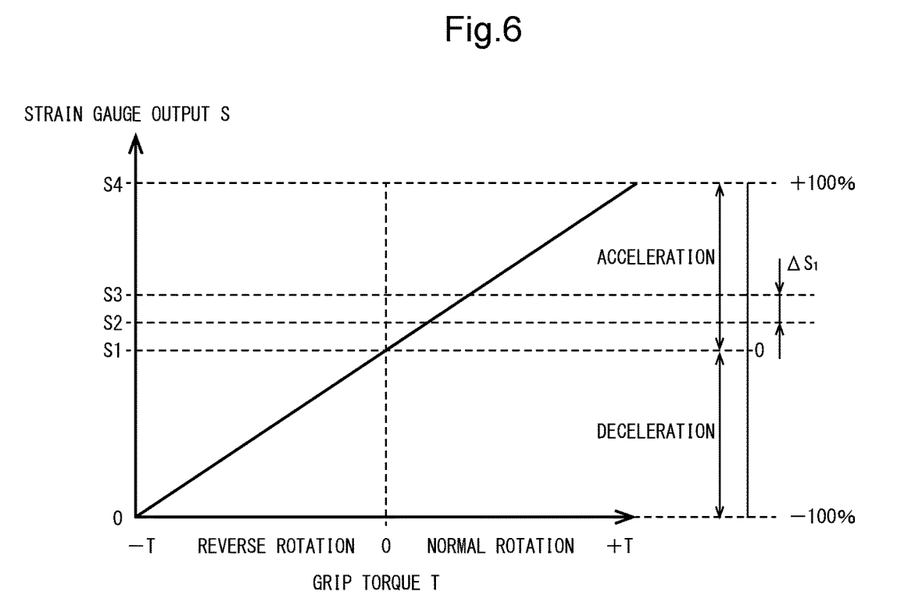
FIG. 6 is a graph illustrating the relationship between a grip torque and a strain gauge output.

FIG. 6 is a graph illustrating the relationship between a grip torque T and the strain gauge output S. The grip torque T and the strain gauge output S are substantially proportional to each other. When the grip torque T, which is the force of twisting the handlebar grip 8, is zero, the strain gauge output S is at its initial value S1 (e.g., 3.3 V). When the strain gauge output S is at its initial value, twisting the handlebar grip 8 in the normal rotation direction increases the driving force K of the motive power source in the direction of acceleration in accordance with an increase in the strain gauge output S. When a strain gauge output S4 (e.g., 6.6 V) is subsequently reached, the maximum driving force is obtained to achieve maximum acceleration (100%).

In the present embodiment, the control section 50 stores a data table. The data table defines the relationship between a vehicle speed V and the running resistance f in consideration, for example, of air resistance, mechanical friction resistance, and tire rolling resistance, which increase with an increase in the vehicle speed V. The driving force K (engine output H) to be actually generated can be determined in consideration of the running resistance f derived from the data table.

The above-described configuration permits the driving force adjustment of the motive power source by applying the twisting force to the handlebar grip 8. This prevents a driving posture from being changed by the rotation of a handlebar grip and makes it possible to obtain a driving force control device with good operability. Further, when output control is exercised in consideration of the running resistance f, for example, the generated driving force K increases with an increase in the vehicle speed even if the grip torque T remains unchanged. Consequently, an operational load imposed on the driver is reduced to provide improved operability.

Moreover, when the grip torque T reverts to zero in a state where the driving force K is generated by the motive power source, control is executed to gradually decrease the driving force K no matter whether the engine E or the electric motor M is used as the motive power source. As such control is exercised, the driving force K of the motive power source is naturally decreased when no twisting force N is applied to the handlebar grip 8.

Meanwhile, when the grip torque T is zero, twisting the handlebar grip 8 in the reverse rotation direction decreases the driving force K of the motive power source in the direction of deceleration in accordance with a decrease in the strain gauge output S. In this instance, the throttle valve is fully closed if the engine E is employed as the motive power source, and the driving force K oriented in the direction of acceleration is reduced to zero if the electric motor M is employed as the motive power source. Further, when the electric motor M is employed as the motive power source, regenerative control may be exercised to generate electrical power generation resistance in order to obtain the driving force K oriented in the direction of deceleration. Furthermore, even if the twisting force N changes within a first predetermined range $\Delta S_1$, the control section 50 is able to execute control in such a manner as to prevent the driving force K from being changed by such a change in the twisting force N. As such control is exercised, the vehicle can be easily maintained at a constant speed without allowing the driving force to change in accordance with a slight change in the twisting force applied to the handlebar grip.

The vehicle driving force control device according to the present embodiment is also capable of executing control in such a manner as to switch from a normal running mode to a cruise control mode when the strain gauge output S is at a predetermined value of S2 (e.g., 3.6 V). Such cruise control permits the vehicle to cruise at a constant speed by automatically adjusting the driving force K so as to achieve balance between the driving force K and the running resistance f. Setup data may be adjusted so as to switch to cruise control when a predetermined time t elapses in a state where the strain gauge output S is at the predetermined value S2.

Figure 7:
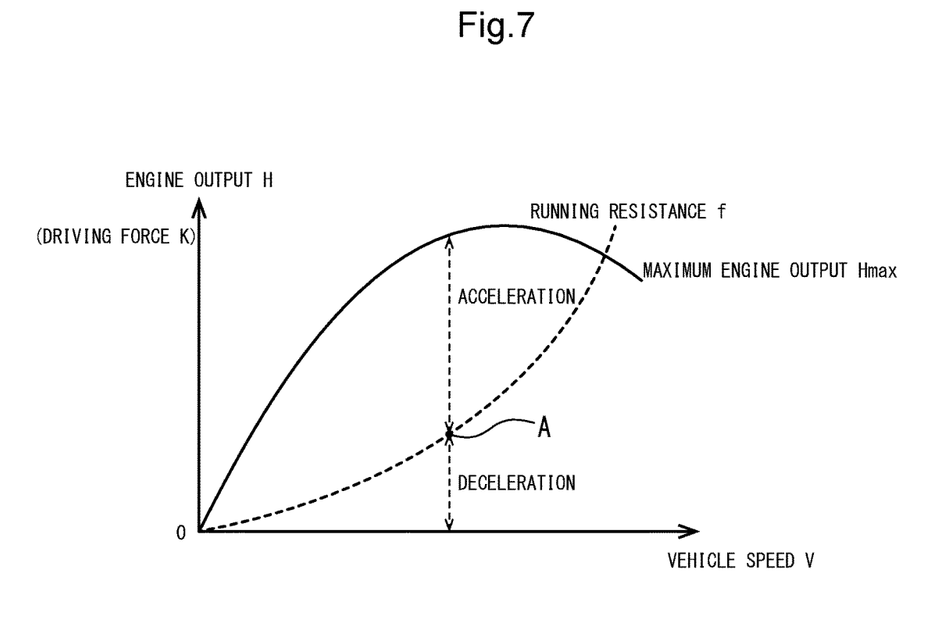
FIG. 7 is a graph illustrating the relationship between a vehicle speed, an engine output, and a running resistance.

FIG. 7 is a graph illustrating the relationship between the vehicle speed V, the engine output H, and the running resistance f. As illustrated in FIG. 7, the motorcycle 1 accelerates when the engine output H is higher than the running resistance f and not higher than a maximum engine output Hmax. However, the motorcycle 1 decelerates when the engine output H is lower than the running resistance f. That is to say, when the engine output H is maintained at a boundary point A, the vehicle is able to cruise at a constant speed. In some cases, however, it is not easy to steadily maintain the engine output H at the boundary point A because a handlebar grip rotation operation may be affected, for instance, by vibration caused by road surface irregularities.

For ease of switching to the cruise control mode under the above circumstance, if the strain gauge output S is within a small opening difference range (first predetermined range) $\Delta S_1$ between the strain gauge outputs S2 and S3, which are illustrated in FIG. 6, for a predetermined period of time while the motorcycle 1 is running, cruise control may be initiated to automatically adjust the driving force K in such a manner as to maintain the engine output H at the boundary point A. Further, while cruise control is being executed, cruise control may be continuously exercised even if the grip torque T slightly changes. The width and position of the first predetermined range $\Delta S_1$ may be variously modified.

Figure 8:
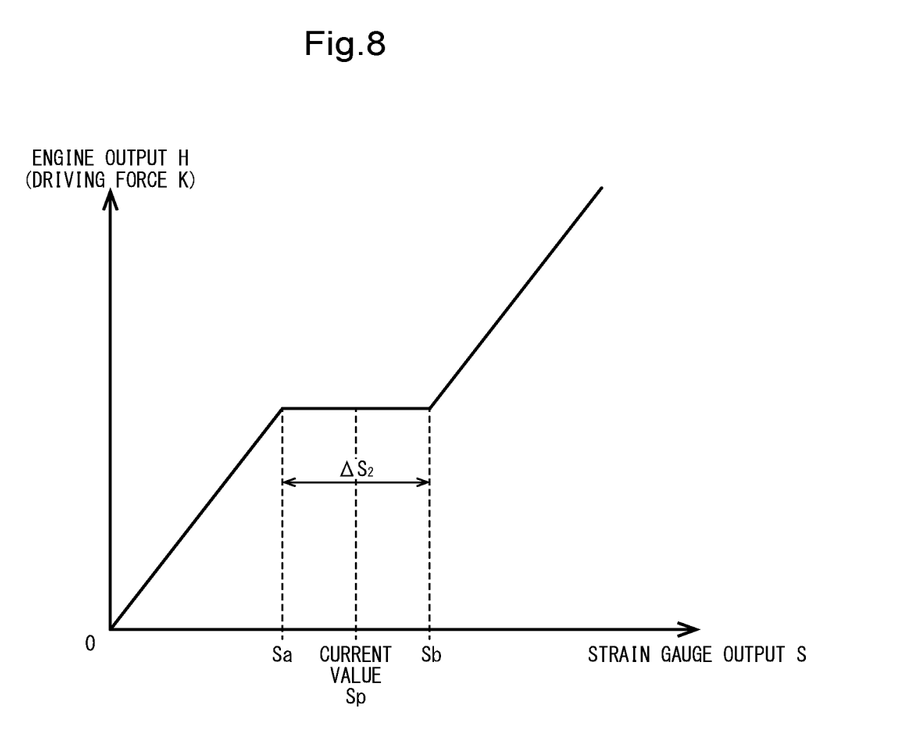
FIG. 8 is a graph illustrating the relationship during cruise control between the strain gauge output and the engine output.

FIG. 8 is a graph illustrating the relationship during cruise control between the strain gauge output S and the engine output H. When the strain gauge output S is at a current value of Sp at the beginning of cruise control, the present embodiment keeps the engine output H unchanged during cruise control even if the strain gauge output S changes within a second predetermined range $\Delta S_2$ between Sa and Sb. The above-described control process reduces the operational load imposed on the driver. More specifically, operating only the handlebar grip 8 makes it possible to switch from normal control to cruise control. Additionally, after switching to cruise control, cruise control is continuously exercised even if the grip torque T is slightly changed, for example, by road surface irregularities.

Further, $\Delta S_1$ setup for facilitating a switch to the cruise control mode illustrated in FIG. 6 and setup for defining the relationship illustrated in FIG. 8 between the strain gauge output S and the engine output H, or more specifically, setup for preventing the engine output H from being changed even if the strain gauge output S changes within the second predetermined range $\Delta S_2$ between Sa and Sb may alternatively be performed by turning on the cruise setup switch 19 while the vehicle is stopped or normally running. Performing the above-described setup prevents the driving force K from being changed by a slight change in the grip torque T due, for instance, to road surface irregularities and reduces the operational load imposed on the driver. Meanwhile, a slight grip torque adjustment can be reflected in the driving force without delay by turning off the cruise setup switch 19. The second predetermined range $\Delta S_2$ may be set to a smaller value than the first predetermined range $\Delta S_1$.

Figure 9:
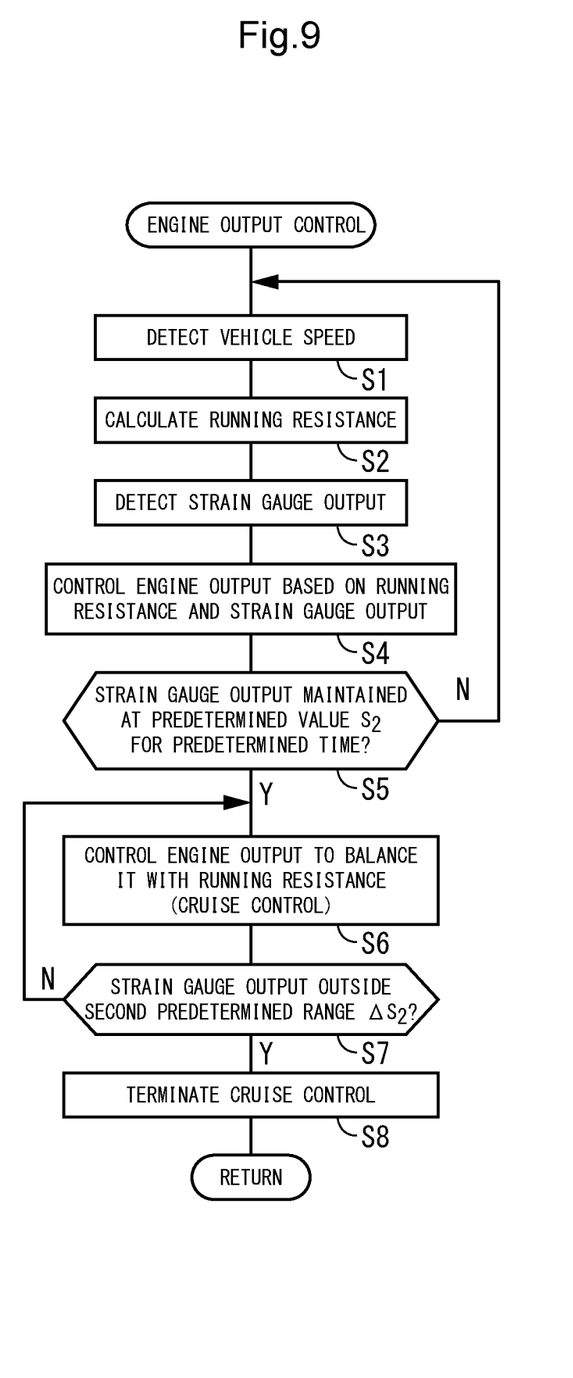
FIG. 9 is a flowchart illustrating an engine output control procedure according to the present embodiment.

FIG. 9 is a flowchart illustrating an engine output control procedure according to the present embodiment. When the vehicle speed sensor 54 detects the vehicle speed in step S1, the running resistance calculation means 51 calculates the running resistance f in step S2. In step S3, the strain gauge output S is detected. Subsequently, in step S4, the engine output change means 53 executes output control over the engine E in accordance with the running resistance f and the strain gauge output S.

In step S5, a check is performed to determine whether the strain gauge output S is maintained at the predetermined value S2 for the predetermined time t. If an affirmative determination is made in step S5, processing proceeds to step S6. In step S6, cruise control is executed to control the engine output H in such a manner as to balance it with the running resistance f. If, by contrast, a negative determination is made in step S5, processing returns to step S1.

In step S7, a check is performed to determine whether the strain gauge output S is outside the second predetermined range $\Delta S_2$. If a negative determination is made in step S7, processing returns to step S6 in order to continue with cruise control. If, by contrast, an affirmative determination is made in step S7, processing proceeds to step S8. In step S8, cruise control terminates.

According to the above control process, cruise control terminates when the handlebar grip 8 is operated by using the twisting force N outside the second predetermined range $\Delta S_2$. Consequently, cruise control can be initiated and terminated by operating only the handlebar grip 8.

Figure 10:
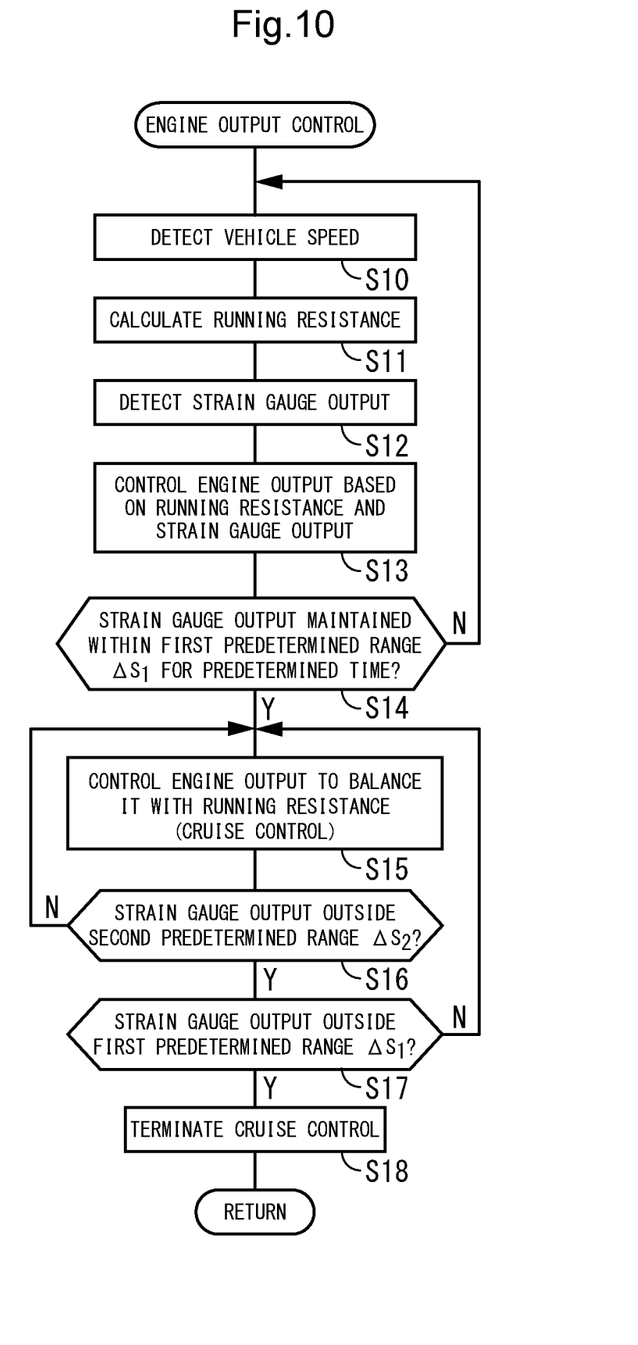
FIG. 10 is a flowchart illustrating the engine output control procedure according to a modification of the present embodiment.

FIG. 10 is a flowchart illustrating the engine output control procedure according to a modification of the present embodiment. When the vehicle speed sensor 54 detects the vehicle speed in step S10, the running resistance calculation means 51 calculates the running resistance f in step S11, and then the strain gauge output S is detected in step S12. Subsequently, in step S13, the engine output change means 53 executes output control over the engine E in accordance with the running resistance f and the strain gauge output S.

In step S14, a check is performed to determine whether the strain gauge output S is within the first predetermined range $\Delta S_1$ for the predetermined time t. If an affirmative determination is made in step S14, processing proceeds to step S15. In step S15, cruise control is executed to control the engine output H in such a manner as to balance it with the running resistance f. If, by contrast, a negative determination is made in step S14, processing returns to step S10.

In step S16, a check is performed to determine whether the strain gauge output S is outside the second predetermined range $\Delta S_2$. If a negative determination is made in step S16, processing returns to step S15 in order to continue with cruise control. If, by contrast, an affirmative determination is made in step S16, processing proceeds to step S17. In step S17, a check is performed to determine whether the strain gauge output S is outside the first predetermined range $\Delta S_1$. If a negative determination is made in step S17, processing returns to step S15 in order to continue with cruise control. If, by contrast, an affirmative determination is made in step S17, processing proceeds to step S18. In step S18, cruise control terminates.

According to the above control process, cruise control terminates when the handlebar grip 8 is operated by using the twisting force N outside the first predetermined range $\Delta S_1$ and the second predetermined range $\Delta S_2$. Consequently, cruise control can be initiated and terminated by operating only the handlebar grip 8.

Figure 11:
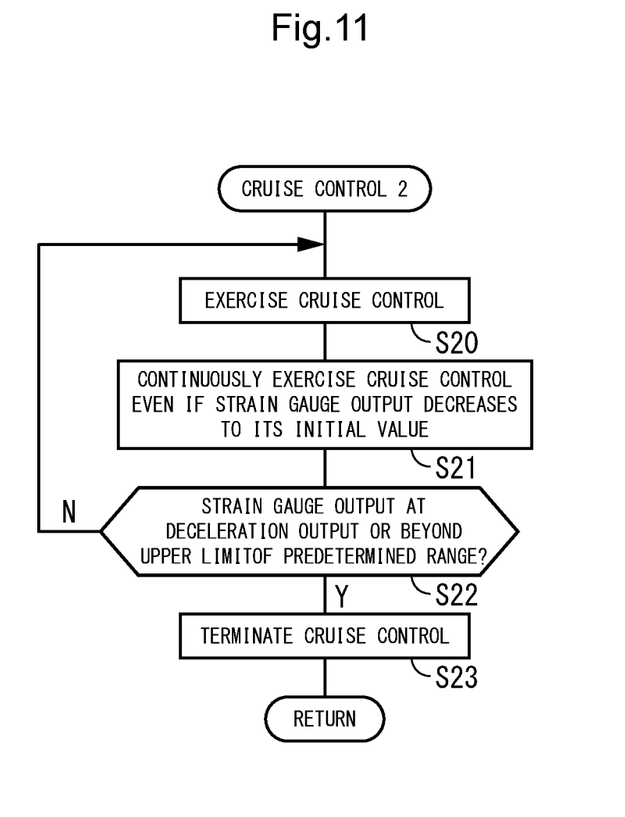
FIG. 11 is a flowchart illustrating a procedure for cruise control 2.

FIG. 11 is a flowchart illustrating a procedure for cruise control 2, which terminates when modified cruise control termination conditions are established. This modification is characterized in that cruise control is continuously exercised even when the grip torque T is reduced to zero during cruise control.

In step S20, cruise control execution is in progress. In step S21, cruise control is continuously exercised even if the strain gauge output S decreases to its initial value S1. Subsequently, in step S22, a check is performed to determine whether the strain gauge output S is at a deceleration value (reverse rotation direction value) or beyond the upper limit of a predetermined range. If a negative determination is made in step S22, processing returns to step S20 in order to continue with cruise control. If, by contrast, an affirmative determination is made in step S22, processing proceeds to step S23. In step S23, cruise control terminates.

According to the above control process, even if no twisting force N is applied to the handlebar grip 8, cruise control is continuously exercised once it is initiated. This not only reduces the load imposed on the right hand of the driver during cruise control, but also terminates cruise control when the handlebar grip 8 is rotated in the normal rotation direction by applying a force greater than a predetermined value or is operated in the reverse rotation direction. Consequently, cruise control can be selectively initiated and terminated by operating only the handlebar grip 8.

For example, the shape of the vehicle, the shape of the engine or electric motor acting as the motive power source, the shape and structure of the handlebar and handlebar grip, the structure and material of the detection target, the structure of the strain gauge, the contents of the database defining the relationship between vehicle speed and running resistance, the configuration of the control section, and the predetermined grip torque range defined for changing the mode of driving force generation are not limited to those described in the foregoing embodiment and may be variously changed. For example, when the strain gauge output is within a predetermined range, the driving force may be controlled to not only maintain a fixed driving force but also maintain a constant vehicle speed based on the output of the vehicle speed sensor. The vehicle driving force control device according to the present invention is applicable not only to motorcycles but also, for example, to various straddle-type three- or four-wheeled vehicles and work machines that use a handlebar grip to control the driving force of a motive power source. The twisting force is a force that is applied by a vehicle occupant in order to twist or grasp a handlebar grip.

REFERENCE SIGNS LIST

1 . . . motorcycle (vehicle),
30 . . . strain gauge (twisting force detection means),
50, 50a . . . control section (vehicle driving force control device),
51 . . . running resistance calculation means,
52 . . . gear ratio detection means,
53 . . . engine output change means,
54 . . . vehicle speed sensor,
55 . . . motor output change means,
f . . . running resistance,
E . . . engine,
M . . . motor,
N . . . twisting force,
K . . . driving force,
H . . . engine output,
V . . . vehicle speed,
$\Delta S$ . . . predetermined range

The invention claimed is:

1. A vehicle driving force control device for controlling a driving force of a motive power source in accordance with an operation of a handlebar grip attached to a vehicle, the handlebar grip being nonrotatably secured to the vehicle, the vehicle driving force control device comprising:

twisting force detection means for detecting a twisting force that is oriented in one direction or in the other direction and applied to the handlebar grip;

vehicle speed detection means for detecting a vehicle speed of the vehicle;

running resistance calculation means for determining a running resistance basedo n the vehicle speed, and a control section configured to control the driving force in accordance with the detected twisting force, wherein the control section exercises control to increase the driving force in accordance with the twisting force oriented in the one direction, and if the twisting force remains at the predetermined value or within the first predetermined range for a predetermined period of time, the control section executes cruise control for balancing the driving force with the running resistance.

2. The vehicle driving force control device according to claim 1, wherein, when the twisting force is not detected by the twisting force detection means, the control section exercises control to gradually decrease the driving force of the motive power source.

3. The vehicle driving force control device according to claim 2, wherein the control section exercises control to decrease the driving force in accordance with the twisting force oriented in the other direction.

4. The vehicle driving force control device according to claim 2, comprising:

wherein, when the twisting force is at a predetermined value, the control section controls the driving force in such a manner as to keep the vehicle speed constant.

5. The vehicle driving force control device according to claim 2, wherein, even when the twisting force changes within a first predetermined range, the control section does not change the driving force in accordance with the change in the twisting force.

6. The vehicle driving force control device according to claim 2, wherein the vehicle is a motorcycle that uses an engine or an electric motor as a motive power source, the handlebar grip is fastened to an end of a handlebar through a detection target, the handlebar steering a front wheel of the motorcycle, and the twisting force detection means is a strain gauge attached to the detection target.

7. The vehicle driving force control device according to claim 1, wherein the control section exercises control to decrease the driving force in accordance with the twisting force oriented in the other direction.

8. The vehicle driving force control device according to claim 1, comprising:

wherein, when the twisting force is at a predetermined value, the control section controls the driving force in such a manner as to keep the vehicle speed constant.

9. The vehicle driving force control device according to claim 1, wherein, even when the twisting force changes within a first predetermined range, the control section does not change the driving force in accordance with the change in the twisting force.

10. The vehicle driving force control device according to claim 1, wherein, if the twisting force is outside a second predetermined range during the cruise control, the cruise control terminates.

11. The vehicle driving force control device according to claim 1, further comprising:

gear ratio detection means for detecting the gear ratio of a transmission of the vehicle, wherein the control section controls the driving force in accordance with the twisting force, the gear ratio, and the running resistance.

12. The vehicle driving force control device according to claim 1, wherein the vehicle is a motorcycle that uses an engine or an electric motor as a motive power source, the handlebar grip is fastened to an end of a handlebar through a detection target, the handlebar steering a front wheel of the motorcycle, and the twisting force detection means is a strain gauge attached to the detection target.

13. The vehicle driving force control device for controlling a driving force of a motive power source in accordance with an operation of a handlebar grip attached to a vehicle, the handlebar grip being nonrotatably secured to the vehicle, the vehicle driving force control device, comprising:

twisting force detection means for detecting a twisting force that is oriented in one direction or in the other direction applied to the handlebar grip;

vehicle speed detection means for detecting a vehicle speed of the vehicle;

running resistance calculation means for determining a running resistance based on the vehicle speed; and a control section configured to control the driving force in accordance with the detected twisting force, wherein the control section exercises control to increase the driving force in accordance with the twisting force oriented in the one direction, wherein, when the twisting force is not detected by the twisting force detection means, the control section exercises control to gradually decrease the driving force of the motive power source, and wherein, if the twisting force remains at the predetermined value or within the first predetermined range for a predetermined period of time, the control section executes cruise control for balancing the driving force with the running resistance.

14. The vehicle driving force control device according to claim 13, wherein, if the twisting force is outside a second predetermined range during the cruise control, the cruise control terminates.

15. The vehicle driving force control device according to claim 13, further comprising:

gear ratio detection means for detecting the gear ratio of a transmission of the vehicle, wherein the control section controls the driving force in accordance with the twisting force, the gear ratio, and the running resistance.

* * * * *